(12) United States Patent
Premkumar et al.

(10) Patent No.: US 11,902,465 B2
(45) Date of Patent: Feb. 13, 2024

(54) HANDLING OF PREEMPTIVE RESPONSES TO USERS OF A COMMUNICATION NETWORK

(71) Applicant: Telefonaktiebolaget LM Ericsson (publ), Stockholm (SE)

(72) Inventors: Karthikeyan Premkumar, Saint-Laurent (CA); Meenakshi Sundaram Govindassamy, Chennai (IN)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 265 days.

(21) Appl. No.: 17/312,097

(22) PCT Filed: Dec. 18, 2018

(86) PCT No.: PCT/IN2018/050851
§ 371 (c)(1),
(2) Date: Jun. 9, 2021

(87) PCT Pub. No.: WO2020/129072
PCT Pub. Date: Jun. 25, 2020

(65) Prior Publication Data
US 2022/0030108 A1  Jan. 27, 2022

(51) Int. Cl.
*H04M 3/493* (2006.01)
*G06N 20/00* (2019.01)
(52) U.S. Cl.
CPC ............ *H04M 3/493* (2013.01); *G06N 20/00* (2019.01)

(58) Field of Classification Search
CPC ........... H04M 3/493; H04M 2203/551; H04M 3/4938; G06N 20/00
See application file for complete search history.

(56) References Cited

U.S. PATENT DOCUMENTS

| 6,061,433 A | 5/2000 | Polcyn et al. | |
| 7,263,177 B1* | 8/2007 | Paterik | H04M 3/54 379/265.09 |
| 8,521,572 B2* | 8/2013 | Hanson | G06Q 30/02 379/265.03 |
| 9,307,080 B1* | 4/2016 | Fernandez | H04M 3/527 |
| (Continued) | | | |

FOREIGN PATENT DOCUMENTS

| CN | 105120373 A | * 12/2015 | ............ G10L 15/22 |
| CN | 107704946 A | 2/2018 | |

*Primary Examiner* — Akelaw Teshale
(74) *Attorney, Agent, or Firm* — COATS & BENNETT, PLLC

(57) ABSTRACT

A response handling arrangement comprises a response prioritizing device (26) with processing circuitry configured to obtain event data (ED) and/or status data (SD) in the communication network concerning a user, where the obtaining is triggered by the user initiating a connection to a response device (24) of the communication network, apply the event data (ED) and/or status data (SD) in a response selecting model (78) of a trained machine learning module (74), and obtain an indication (I) of a type of response to the user from the response selecting model of the trained machine learning module (74) based on the applied event data (ED) and/or status data (SD) for allowing a real-time response of the response type to be made to the user by the response device (24).

19 Claims, 7 Drawing Sheets

(56) References Cited

U.S. PATENT DOCUMENTS

| | | | |
|---|---|---|---|
| 2010/0158210 A1* | 6/2010 | Awad | H04M 3/527 379/88.04 |
| 2013/0156171 A1* | 6/2013 | Springer | H04M 3/42068 379/88.22 |
| 2015/0010134 A1* | 1/2015 | Erel | H04M 3/4936 379/88.01 |
| 2015/0078538 A1* | 3/2015 | Jain | H04M 3/493 379/88.01 |
| 2015/0339728 A1* | 11/2015 | Sura | G06Q 30/0277 705/14.73 |
| 2016/0370952 A1* | 12/2016 | Karnewar | H04M 3/4285 |
| 2017/0070612 A1* | 3/2017 | Li | H04M 3/53308 |
| 2017/0223189 A1* | 8/2017 | Meredith | G10L 25/03 |
| 2017/0366496 A1* | 12/2017 | Habermehl | H04L 51/226 |
| 2019/0095927 A1* | 3/2019 | Shimpi | G06N 5/025 |

\* cited by examiner

HANDLING OF PREEMPTIVE RESPONSES TO USERS OF A COMMUNICATION NETWORK

TECHNICAL FIELD

The invention relates to communication networks. More particularly, the invention relates to response handling arrangements, method, computer program and computer program product for handling responses to users of a communication network as well as to a communication network comprising such as response handling arrangement.

BACKGROUND

The provision of response system for communication networks, which users may contact in order to getting answers and help on various issues is today in many cases automated.

One example of this is the use of Interactive voice response (IVR). IVR is a technology that allows a computer to interact with humans through the use of voice and Dual Tone Multiple Frequency (DTMF) tones input via a keypad. In telecommunications, IVR allows customers to interact with a company's host system via a telephone keypad or by speech recognition, after which services can be inquired about through an IVR dialogue. IVR systems can respond with pre-recorded or dynamically generated audio to further direct users on how to proceed.

IVR may in a Business Support System (BSS) of a telecommunication network be used for handling different customer queries such as finding the mobile prepaid balance, doing recharges, paying bills, raising complaints which could be billing related or network related as well as purchase of new products etc.

Currently above-mentioned queries are handled partly using the automated voice response systems and partly with a customer care operator support.

There are a number of problems with the above-described scenarios. The menu driven approach takes time. The user may need to listen to all menus in order to reach the option which he or she wants. The customer experience is low. Customer patience may get really tested of the user needs to listen to all options before reaching the option he or she is interested in. Wait times and queues may increase due to the long time taken for resolving the customer queries/complaints.

It would in view of what is discussed above be of advantage to improve the user friendliness in the way that user queries are handled in the response system so that the user obtains a response to his or her query in a faster way.

SUMMARY

One object of the invention is to improve the user-friendliness in the handling of user queries in a communication network.

This object is according to a first aspect achieved by a response handling arrangement for handling responses to users of a communication network. The response handling arrangement comprises a response prioritizing device with processing circuitry. The processing circuitry is in turn configured to obtain event data and/or status data in the communication network concerning a user, where the obtaining has been triggered by the initiating of a connection to a response device of the communication network by the user, apply the event data and/or status data in a response selecting model of a trained machine learning module, and obtain an indication of a type of response to the user from the response selecting model of the trained machine learning module based on the applied event data and/or status data. Thereby the response device is allowed to make a real-time response of the response type to the user.

The object is according to a second aspect achieved by a response handling arrangement for handling responses to users of a communication network. The response handling arrangement comprises:

means for obtaining event data and/or status data in the communication network concerning a user, where the obtaining has been triggered by the initiating of a connection to a response device of the communication network by the user, means for applying the event data and/or status data in a response selecting model of a trained machine learning module, and means for obtaining an indication of a type of response from the response selecting model of the trained machine learning module based on the applied event data and/or status data. Thereby the response device is allowed to make a real-time response of the response type to the user.

The object is according to a third aspect achieved through a method for handling responses to users of a communication network. The method is performed in a response handling arrangement and comprises:

obtaining event data and/or status data in the communication network concerning a user, where the obtaining has been triggered by the initiating of a connection to a response device of the communication network by the user, applying the event data and/or status data in a response selecting model of a trained machine learning module, and obtaining an indication of a type of response from the response selecting model of the trained machine learning module based on the applied event data and/or status data. Thereby the response device is allowed to make a real-time response of the response type to the user.

The object is according to a fourth aspect achieved through a communication network comprising a response handling arrangement for handling responses to users of the communication network, where the response handling arrangement comprises a response prioritizing device. The response prioritizing device in turn comprises processing circuitry configured to obtain event data and/or status data in the communication network concerning a user, where the obtaining has been triggered by the initiating of a connection to a response device of the communication network by the user, apply the event data and/or status data in a response selecting model of a trained machine learning module, and obtain an indication of a type of response from the response selecting model of trained machine learning module based on the applied event data and/or status data. Thereby the response device is allowed to make a real-time response of the response type to the user.

This object is according to a fifth aspect also achieved by a computer program for handling responses to users of a communication network. The computer program comprises computer program code which when run in a response prioritizing device of a response handling arrangement, causes the response prioritizing device to:
- obtain event data and/or status data in the communication network concerning a user, where the obtaining has been triggered by the initiating of a connection to a response device of the communication network by the user,
- apply the event data and/or status data in a response selecting model of a trained machine learning module, and
- obtain an indication of a type of response from the response selecting model of the trained machine learning module based on the applied event data and/or status data. Thereby the response device is allowed to make a real-time response of the response type to the user.

The object is according to a sixth aspect achieved through a computer program product for handling responses to users of a communication network. the computer program product comprises a data carrier with computer program code according to the fifth aspect.

As the response is of the response type it also corresponds to the indication. Moreover, the event and/or status data may be obtained in a data collecting window that precedes the user initiating a connection to the response device.

Each indication may point to a corresponding section of a markup language file, which section may specify a response to be given to the user and how user inputs are to be interpreted. The markup language file may be an extensive markup language file, a media server control markup language file or a VoiceXML file.

The event data may comprise data of activities made by the user in the communication network and the status data may comprise user account data, such as a balance of the user account. Each response type may additionally be related to a different type of topic provided by the response device. The response may comprise options to the user in the topics of charging or billing, network use, customer account management and purchases, like purchases of services and products.

According to a first variation of the first aspect, the response handling arrangement further comprises the response device. This response device comprises processing circuitry configured to receive the connection initiation, select a response of the response type according to the indication and make the selected response to the user via a user connection being set up based on the connection initiation.

In a corresponding variation of the second aspect claim, the response handling arrangement further comprises the response device comprises means for selecting a response of the response type according to the indication and means for making the selected response to the user via a user connection being set up based on the connection initiation.

In a corresponding variation of the third aspect, the method further comprises receiving the connection initiation, selecting a response of the response type according to the indication and making the selected response to the user via a user connection being set up based on the connection initiation.

According to a second variation of the first aspect, the processing circuitry of the response device is further operative to select a default response in case the user rejects the selected response.

In a corresponding variation of the second aspect, the response device comprises means for selecting a default response in case the user rejects the selected response.

In a corresponding variation of the third aspect, the method comprises selecting a default voice response in case the user rejects the selected voice response.

According to a third variation of the first aspect, the processing circuitry of the response prioritizing device is further configured to implement the machine learning module and train it through applying training data comprising features associated with a sample set of events and a number of known desired response types in order to obtain the response selecting model.

According to a corresponding variation of the second aspect, the response prioritizing device comprises means for implementing the machine learning module and means for training the machine learning module through applying training data comprising features associated with a sample set of possible events and a number of known desired response types in order to obtain the response selecting model According to a corresponding variation of the third aspect, the method further comprises training the machine learning module through applying training data comprising features associated with a sample set of possible events and a number of known desired response types in order to obtain the response selecting model.

The training described above may be performed using a probabilistic training method.

The machine learning module may comprise a number of classifiers, each independently determining a type of response.

According to a fourth variation of the first aspect, when obtaining an indication the processing circuitry of the response prioritizing device may in this case be further operative to obtain an indication corresponding to a response type that a majority of the classifiers have determined.

According to a corresponding variation of the second aspect, the means for obtaining an indication of a type of response may be means for obtaining an indication corresponding to a response type that a majority of the classifiers have determined.

According to a corresponding variation of the third aspect, the obtaining of an indication may comprise obtaining an indication corresponding to a response type that a majority of the classifiers have determined.

The invention according to the above-mentioned aspects has a number of advantages. It is user-friendly and improves the user experience. A user can receive the response he or she is looking for in a quicker way without undue queuing and waiting. This may also be done without the user having to navigate through a response menu or wait in a queue for an operator. The issues that the user may be interested in solving may therefore be addressed in a fast and efficient way. The average time that users are involved with the response device may also be reduced and thereby the number of users that can be served may also be increased.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits and methods are omitted so as not to obscure the description of the invention with unnecessary detail.

Figure 1:
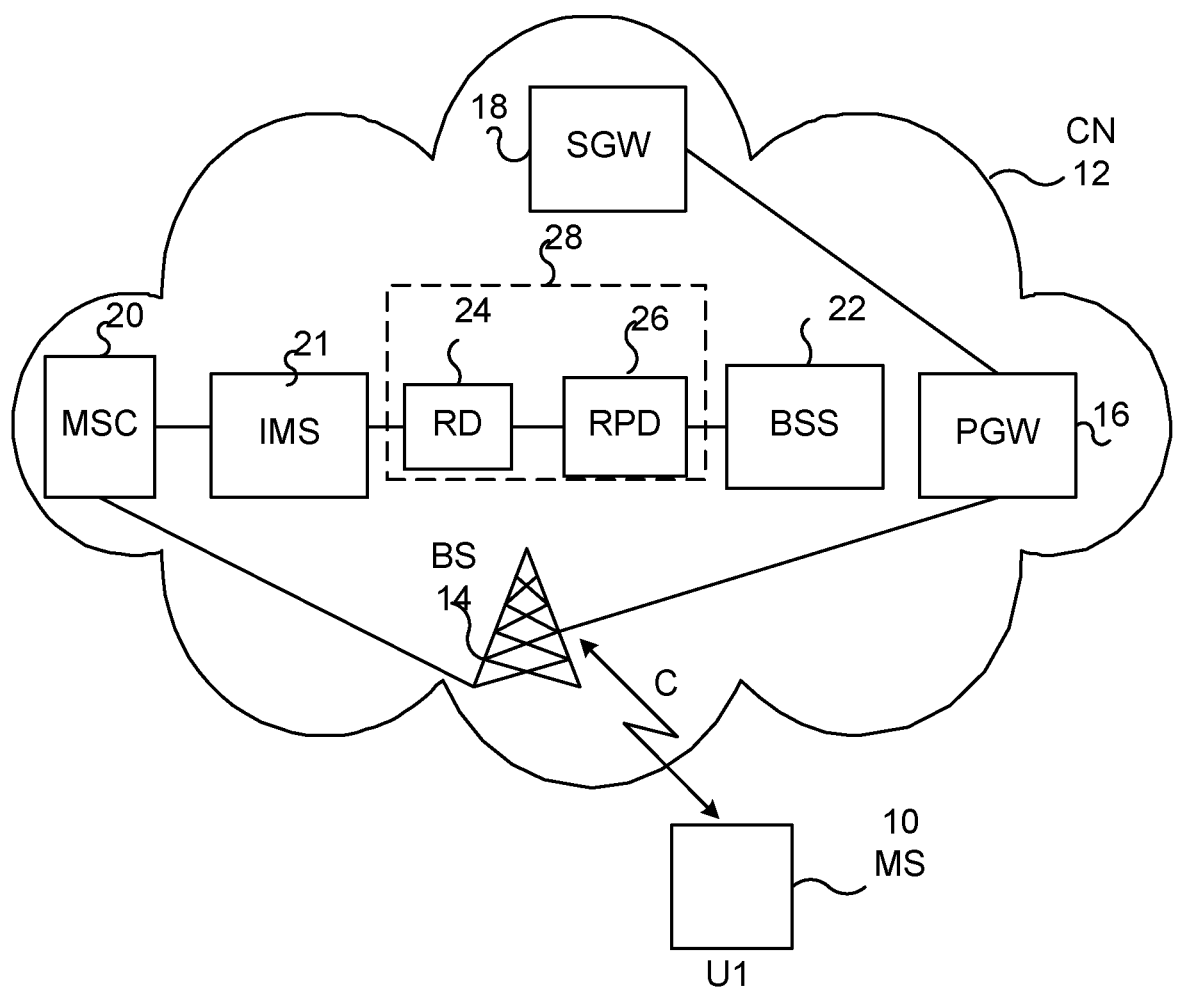
FIG. 1 schematically shows a mobile station connected to a communication network as well as various nodes in the communication network.

FIG. 1 schematically shows a communication network CN 12, which in the present example is a telecommunication network. Furthermore, the communication network 12 is in this case a mobile communication network comprising a base station BS 14 connected to a traffic handling node, in the form of a Mobile Switching Centre (MSC) 20. The base station 14 is also connected to a PGW node 16, where PGW is an acronym for PDN Gateway, where in turn PDN is an acronym for Packet Data Network. The PGW 16 is in turn connected to an SGW 18, where SGW is an acronym for Serving Gateway. The MSC 20 is also connected to a response device RD 24 of as response handling arrangement 28 via an IMS subsystem 21 of the communication network 12, where IMS is an acronym for IP (Internet Protocol) Multimedia Subsystem. The response handling arrangement 28 also comprises a response prioritizing device RPD 26. The response prioritizing device 26 is connected to the response device 24 as well as to a business SubSystem (BSS) 22 of the communication network 12

There is also a mobile station MS 10 that communicates with the network 12 via the base station 14. The mobile station 10 may be a user terminal via which a user U1 connects to the response handling arrangement 28, here exemplified by a telephone call C, and may be a user terminal used to connect to the response device 24.

The mobile communication network 12 may furthermore be a network allowing Internet connectivity such as a third-generation network like Universal Mobile Telecommunications Service (UMTS), a fourth generation network like Long Term Evolution (LTE), or a fifth generation network like 5G.

Aspects of the invention will in the following be described in relation to the communication network 12 when it is a mobile communication network, for instance LTE. However, the invention is not limited to being applied in a mobile communication network but may for instance be applied in any other type of communication network such as a computer communication network.

However, the communication network is with advantage a network with which the user has some sort of association, such as being s subscriber. The user may thus have a registration, such as an account in the communication network 12.

The base station 14, which is often termed eNodeB or just NodeB, is furthermore provided in a part of the mobile communication network 12 termed access network or radio access network (RAN), while the other nodes are provided in a part of the mobile communication network 12 termed a core network.

Figure 2:
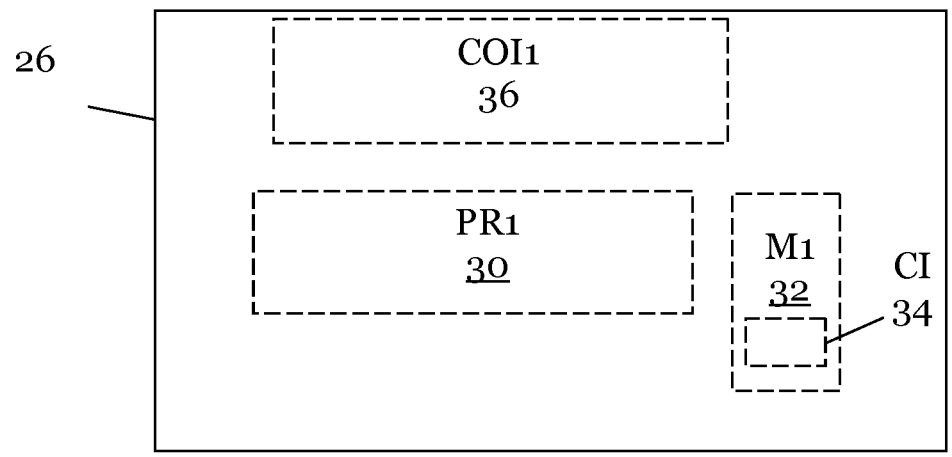
FIG. 2 shows a block schematic of a first way of realizing a response prioritizing device in the communication network.

FIG. 2 shows a block schematic of a first way of realizing the response prioritizing device 26. It may be provided in the form of first software or first computer instructions CI 34 operating on hardware. The hardware includes a first communication interface COI1 36 configured to set up and maintain a wired or wireless connection with the response device 24 as well as with the BSS 22. The hardware further comprises processing circuitry, which may have storage and/or processing capabilities. In particular, processing circuitry may comprise one or more programmable processors, application-specific integrated circuits (ASICs), field programmable gate arrays (FPGAs) or combinations of these (not shown) adapted to execute instructions. In the example given here the processing circuitry comprises a first processor PR1 30 connected to a first program memory M1 32, where the first computer instructions 34 are stored in the memory 32. The software 34, which may thus be stored in a first memory of the hardware, may more particularly comprise a prioritizing handling function.

Figure 3:
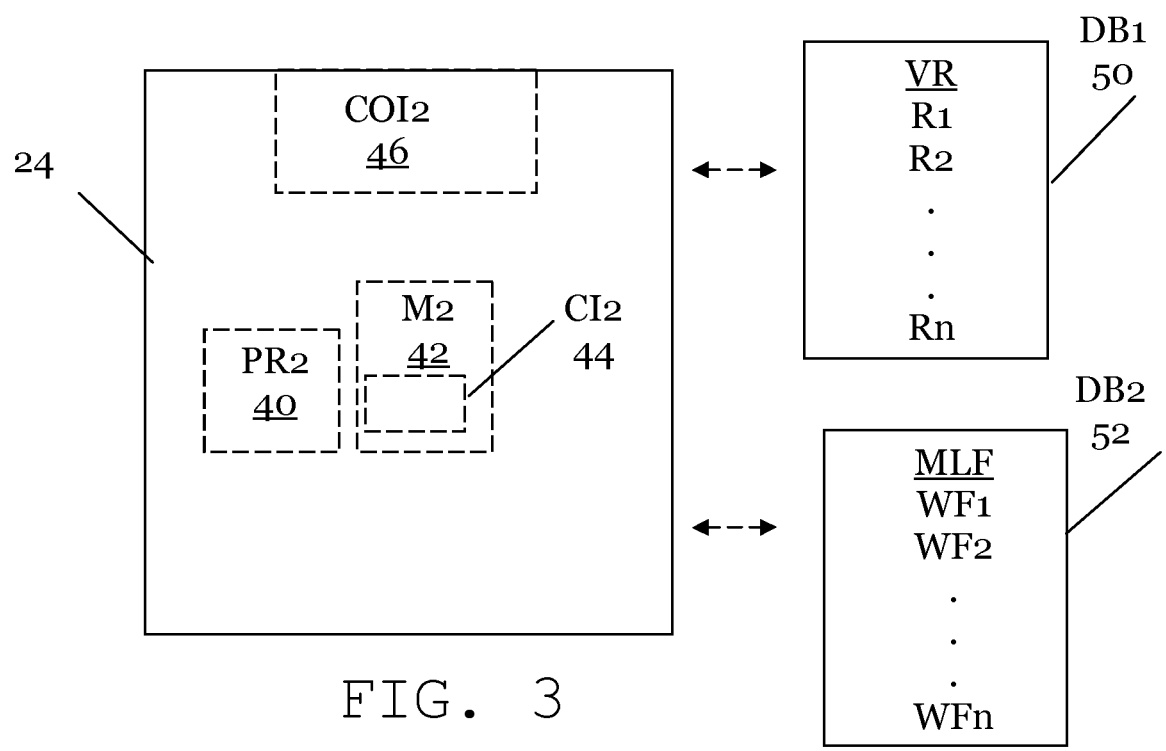
FIG. 3 shows a block schematic of a way of realizing a response device in the communication network.
Figure 4:
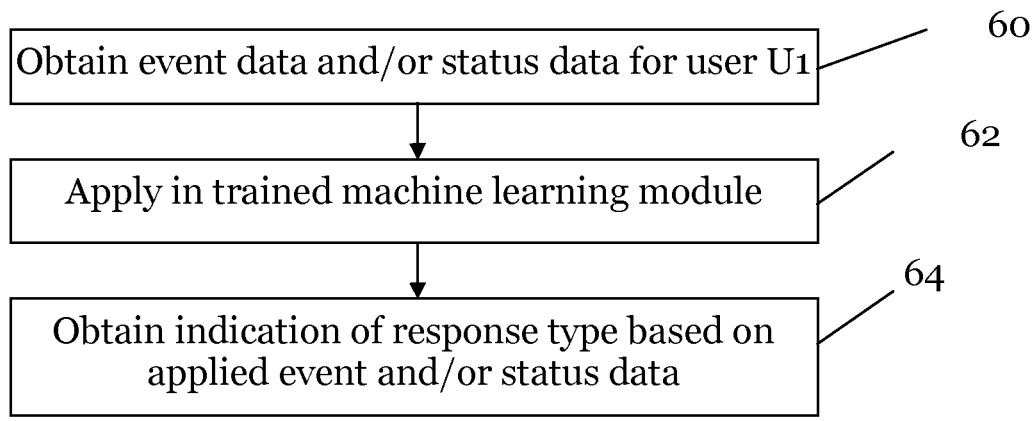
FIG. 4 shows a flow chart of method steps in a method for handling responses to users of the communication network according to a first embodiment.

FIG. 3 shows a block schematic of a first way of realizing the response device 24. It may be provided in the form of second software or second computer instructions CI2 44 operating on hardware. The hardware includes a second communication interface COI2 46 configured to set up and maintain a wired or wireless connection with the response prioritizing device 26 and the IMS 21. Users may additionally connect to the response device 24 via this communication interface 46, either directly or via the IMS 21. The hardware 30 further comprises processing circuitry, which may have storage and/or processing capabilities. In particular, processing circuitry may comprise one or more programmable processors, application-specific integrated circuits (ASICs), field programmable gate arrays (FPGAs) or combinations of these (not shown) adapted to execute instructions. In the example given here the processing circuitry comprises a second processor PR2 40 connected to a second program memory M2 42, where the second computer instructions 44 are stored in the second memory 42. The response device 24 also comprises or has access to a first and a second data base DB1 50 and DB2 52, where the first data base 50 comprises a number of responses R1, R2. Rn, for instance media files with voice responses, and the second database 52 comprises workflows WF1, WF2, . . . WFn for instance in one or more markup language files MLF. Such files may be provided as eXtensive Mark-up Language (XML) files or Media Server Control Markup Language (MSCML) files. In the present example the markup language file is a VoiceXML (VXML) file. A workflow typically comprises computer instructions, which computer instructions typically include a pointer to a response file in the first database 50.

The software 44, which may thus be stored in a memory of the hardware, may also comprise a response handling function set to respond to queries conveyed over connections being initiated by users of the communication network 12.

As is shown in FIG. 1, the response handling arrangement 28 may be part of communication network 12. As an alternative, it may be provided outside of it. When being provided outside of communication network 12, the response handling arrangement 28 may only comprise the response prioritizing device 26, which communicates with the response device 24 inside of the communication network 12. In this case the response handling arrangement 28 may also be realized using cloud computing. When the response handling arrangement 28 is a part of the communication network 12, it may comprise both the response prioritizing device 26 and the response device 24. Also in this case cloud computing is an option. Moreover, when the response device 24 and response prioritizing device 26 are both a part of the communication network, they may be combined and provided in the same physical entity.

In one variation, the response handling arrangement 28 thus only comprises the response prioritizing device 26. The response prioritizing device 26 may additionally be connected to or comprise a machine learning module. The module may here be trained and thereby it may also have a response selecting or decision tree model used in the training.

A user U1 may connect to the response device 24 in order to obtain a response to a query that he or she has. The query may be a query according to different topics, such as regarding the status of a customer account, like the balance of the account, finding a prepaid balance, if an obtained credit has been registered or not, or if purchased services have been registered or not. A query may also be a query regarding problems that the user U1 faces in the communication network, such as if network use is allowed or not, for instance as caused by an exhausted data plan. A query may also be a complaint, which may be a complaint regarding the user account, a complaint regarding the network use or a complaint regarding a purchased product or service.

In order to receive a suitable response, the user therefore connects to the response device 24. In order to connect to the response device 24, the user U1 more particularly initiates a connection to the response device 24, which thereby receives the communication initiation. The response device 24 may in turn signal such a connection initiation to the response prioritizing device 26. The signalling may involve informing the response prioritizing device 26 that a connection attempt is being made as well as an identifier of the user U1. The user connection may be made via a voice call. However, also other ways of connecting are feasible such as via Short Message Service (SMS), e-mail or using a browser. In case the connection is made using a mobile station 10, the user may be identified using his or her mobile subscriber ISDN number MSISDN, where ISDN is an acronym for Integrated Services Digital Network.

The prioritizing function of the response prioritizing device 26 may therefore be triggered by the user connection to the response device 24.

The prioritizing handling function of the response prioritizing device 26 may then obtain event data and/or status data in the communication network 12 concerning the user U1, step 60, which obtaining is thus triggered by the user initiating the connection to the response device 24. The status data may thus comprise user account data such as a balance of a user account of the, data about configured products of the user, contracts of the user, services of the user and their lifecycle states, such as if they are active, expired or suspended. Event data may here be data about activities that the user has made or performed in the communication network 12, such as if attempts have been made to recharge or replenish an account, if requests for service updates have been made etc. The event data may more particularly have been collected in a data collecting window preceding the trigger, i.e preceding the user initiation of the connection to the response device 24. The data collecting window may be a time window of suitable length, for instance 15 minutes, 1 hour, 1 day etc.

Thereafter the prioritizing handling function applies the event and/or status data obtained in the data collecting window in the response selecting model of the trained machine learning module, step 62, which as was stated earlier may be a part of the response prioritizing device 26 or an external module being invoked by the response prioritizing device 26.

The machine learning module may more particularly be trained so that different combinations of event and/or status data leads to different response types being selected. As a response to the application of the event and status data in the response model, the machine learning module then selects a response type that is deemed to address the query of the user. The machine learning module may more particularly select an indication pointing at the response of the response type, either directly or indirectly via a workflow. The response prioritizing function in this way obtains an indication of a response type of interest to the user from the response selecting model of the trained machine learning module based on the applied event and/or status data, step 64. This is more particularly done in order to allow a real-time response of the response type to be made to the user by the response device 24.

In order to accomplish this, the indication may be used to select a corresponding response to be given to the user. The response may then be of a type that is dedicated to a certain topic in which the user is interested. Put differently, a response type is typically associated with a topic that the user is deemed to be interested in.

The indication may therefore be sent from the response prioritizing device 26 to the response device 24, which may in turn select a response of the response type according to the indication and give or make the selected response to the user that corresponds to the indication. The indication may as an example point to a specific section of the markup language file, in which a workflow comprising a pointer to the response as well as computer instructions defining how user inputs are to be interpreted, i.e. defining how further user interaction is to be handled. Alternatively the indication only comprises a pointer to a workflow as a separate markup language file. The indication may also be a direct pointer to a response. The response device 24 may thus receive an indication and then apply it in a markup language file in the second data base 52 in order to obtain knowledge of which response to use. The response device 24 may thereafter fetch a response, such as media file, like a voice file, e.g. a MP3 file, to be presented to the user. The response is then given to the user via the user connection that was set up based on the connection initiation. The response may therefore be made via a communication channel, which with advantage is thus the same communication channel over which the query was made. Thereby a real-time response may be give to the user.

The response may provide options to the user on the topic of the response type. The options may as an example be related to the topics of billing or charging, network use, customer account management and purchases, such as purchases of services and/or products.

It is in this way possible for the user to quickly obtain a response that he or she is interested in. The response is therefore also a pre-emptive response. This may also be done without the user having to navigate through a response menu or wait in a queue for an operator. The issues that the user may be interested in solving may therefore be addressed in a fast and efficient way.

Now a second embodiment will be described with reference being made also to FIGS. 5, 6, 7, 8, 9, 10 and 11.

Figure 5:
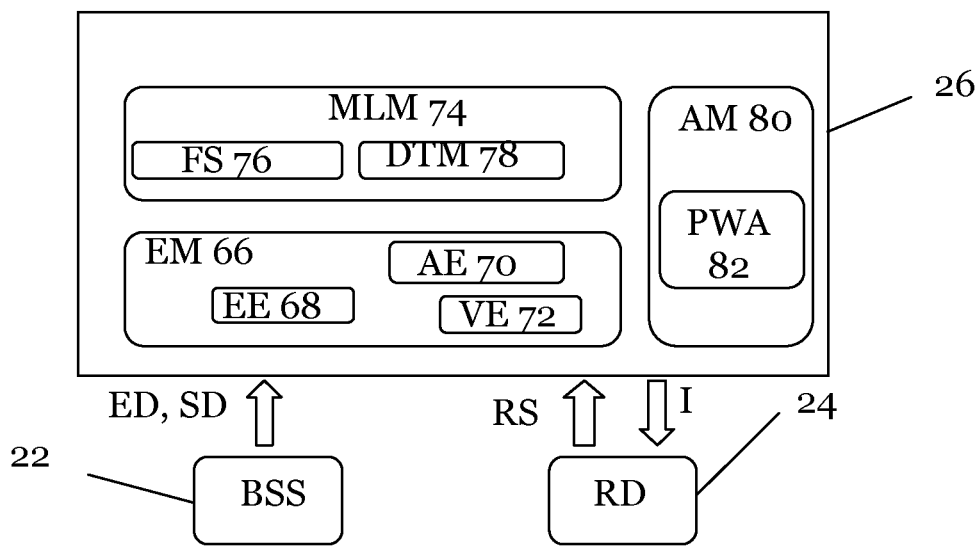
FIG. 5 shows a block schematic of a second way of realizing the response prioritizing device.

In FIG. 5 there is shown a second realization of the response prioritizing device 26 performing the prioritizing handling function. In this case the response prioritizing device 26 comprises an extracting module EM 66 comprising an event extractor EE 68, an account extractor AE 70 and a VXML extractor VE 72. It also comprises the machine learning module MLM 74 comprising a feature selector FS 76 and a decision tree model DTM 78. The response prioritizing device 26 also comprises an application module AM 80 comprising a prioritized workflow applier PWA 82. Event data ED and status data SD is also shown as being transmitted from the BSS 22 to the response prioritizing device 26. The response prioritizing device 26 also receives a request RS for selecting a type of response from the response device 24 as well as delivers a response indication I to the response device 24.

As is indicated above, the above-mentioned modules may be realized as software as well as hardware and may also realize the response prioritizing function.

Figure 6:
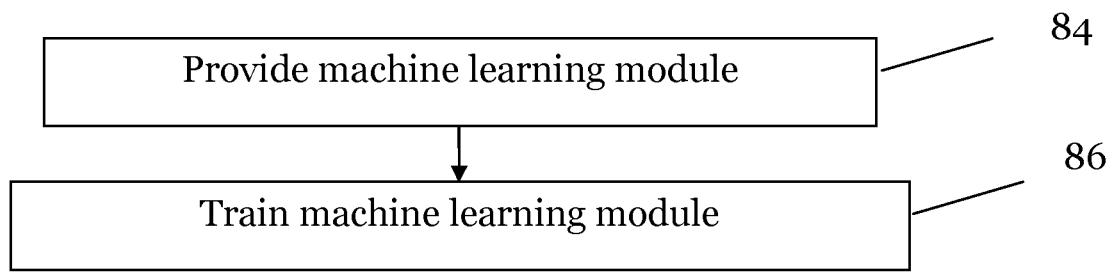
FIG. 6 shows a flow chart of a first number of method steps in a method of handling responses to users of the communication network according to a second embodiment.

FIG. 6 shows a flow chart of a first number of method steps in a method of handling responses to users of the communication network according to a second embodiment, which first number of steps are performed by the machine learning module 74 of the response prioritizing device 26.

Figure 7:
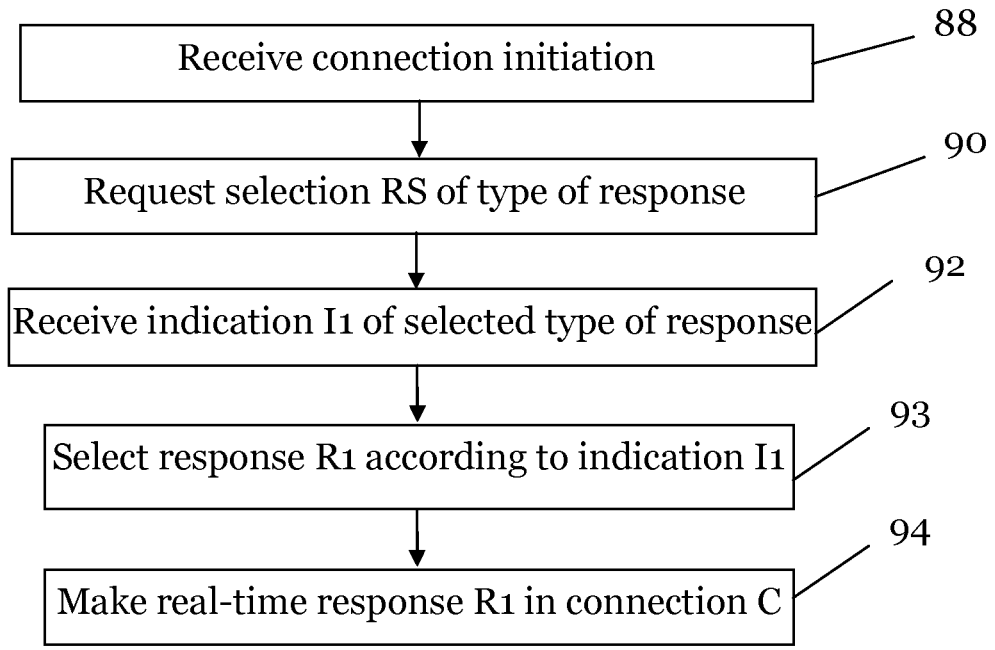
FIG. 7 shows a flow chart of second number of method steps in the method of handling responses to users of the communication network according to the second embodiment.

FIG. 7 shows a flow chart of a second number of method steps in the method of handling responses to users of the communication network according to the second embodiment, which second number of steps are performed by the response device 24.

Figure 8:
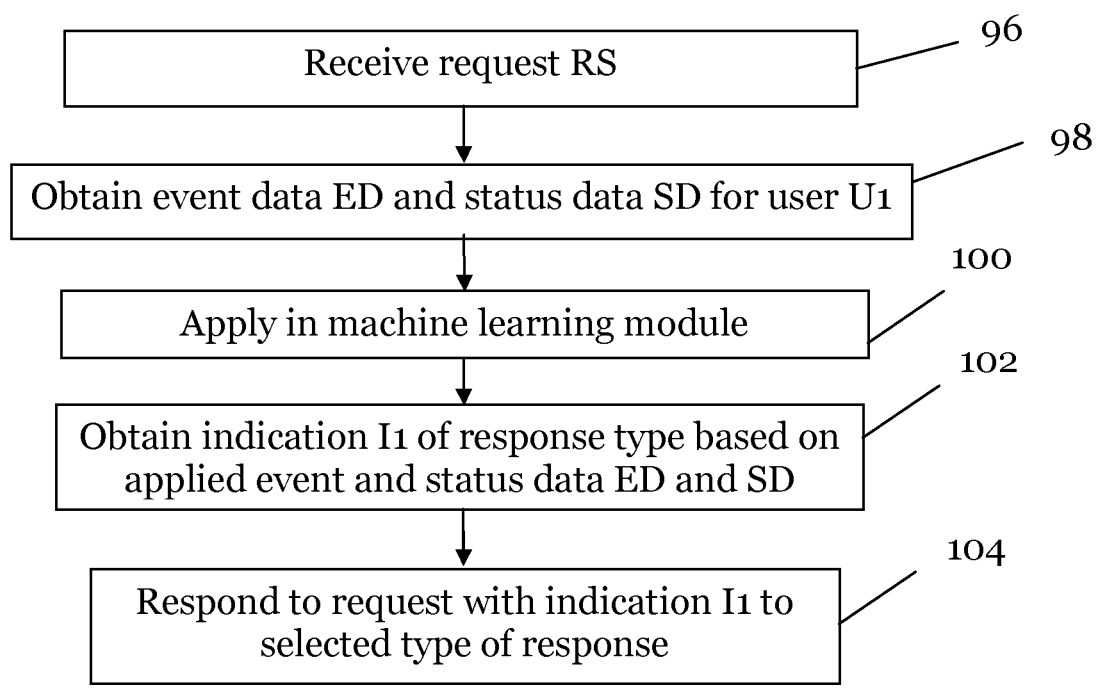
FIG. 8 shows a flow chart of third number of method steps in the method of handling responses to users of the communication network according to the second embodiment FIG. 9 show signals exchanged between a user, the response device, the response prioritizing device and a business support system of the communication network in the method according to the second embodiment.

FIG. 8 shows a flow chart of a third number of method steps in the method of handling responses to users of the communication network according to the second embodiment, which third number of steps are performed by the response prioritizing device 26.

Figure 9:
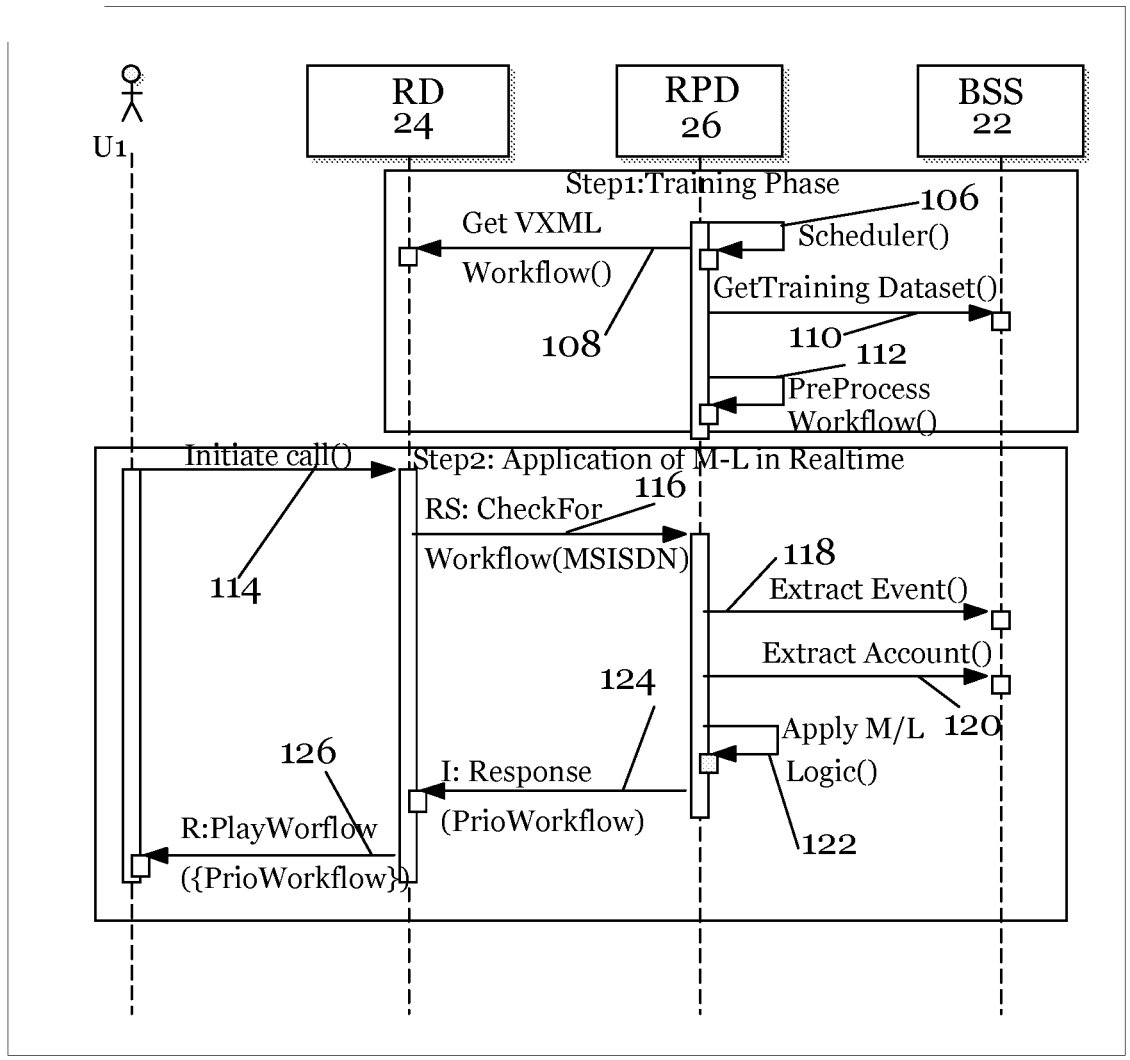

FIG. 9 shows signals exchanged between the user U1, the response device 24, the response prioritizing device 26 and the BSS 22 of the communication network 12.

Figure 10:
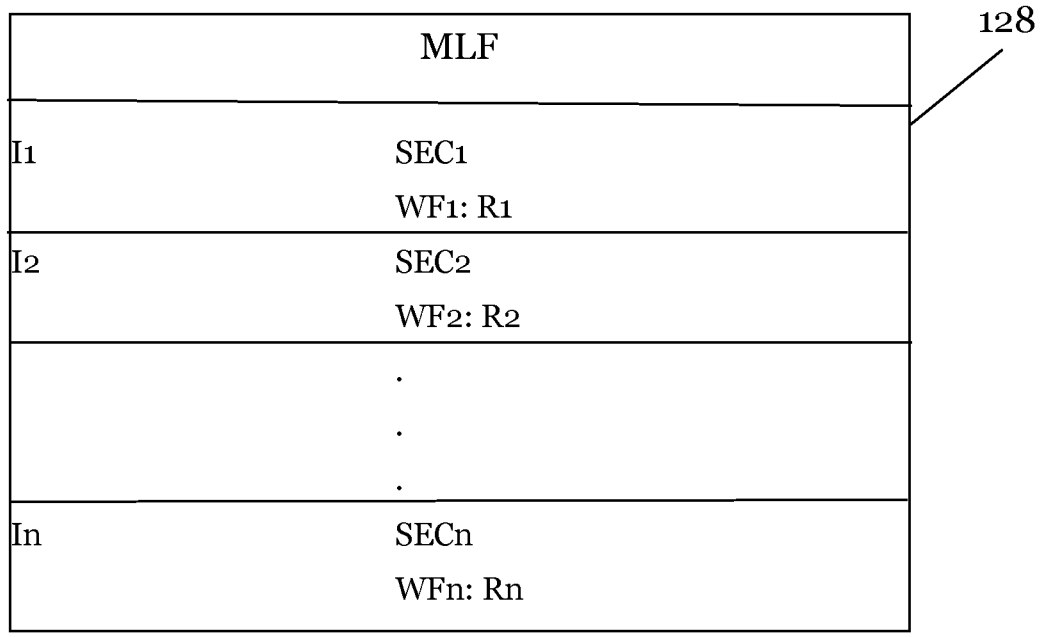
FIG. 10 shows a markup language file with sections identified through identifiers and comprising pointers to responses, FIG. 11 schematically shows a default response menu.

FIG. 10 shows a markup language file MLF with sections identified by identifiers and comprising pointers to responses. There is here a first section SEC1 comprising a first workflow WF1 with a pointer PR1 to a first response, where the first section SEC1 is located via a first response type indication I1. There is also a second section SEC2 comprising a second workflow WF2 with a pointer PR2 to a second response, where the second section SEC2 is located via a second response type indication I2. There is finally an nth section SECn comprising an nth workflow WFn with a pointer PRn to an nth response, where the nth section SECn is located via an nth response type indication In.

Figure 11:
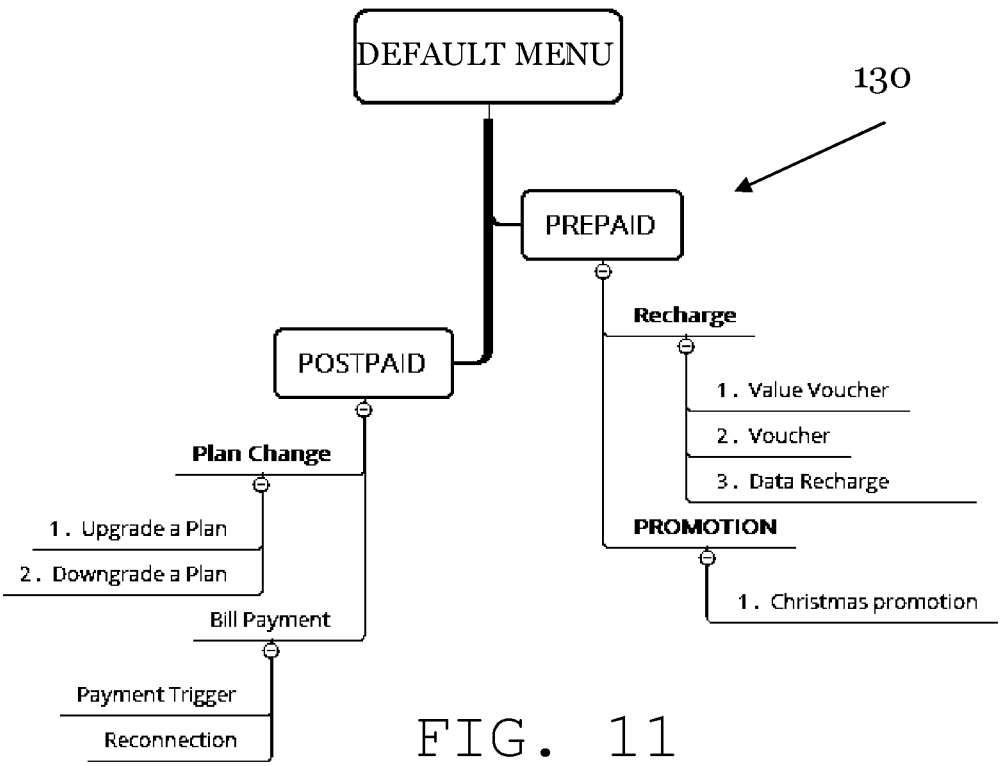

FIG. 11 shows a default response menu 130, in the form of a default IVR menu with a number of user selectable options, here exemplified by a user account handling menu.

The operation according to the second embodiment will be described in the following.

As a non-limiting example the communication of the user U1 may be voice communication. The user may therefore connect to the communication network 12 using a voice connection in the form of a telephone call C. The response device 24 may in this case be an interactive voice response (IVR) device, the markup language file MLF may be a VXML file and the media file used for the response may be a sound file, such as an MP3 file.

In this case the operation may start before the user actually initiates a connection. The operation may more particularly start with the response prioritizing device 26 entering a training phase where it provides the machine learning module 74, step 84, and trains this machine learning module 74, step 86. The training may involve applying training data comprising features associated with a sample set of possible events and a number of known desired response types in order to obtain the response selecting model. The training may additionally be performed using a probabilistic training method.

The training may more particularly involve the machine learning module 74 scheduling 106 a training. In this the feature selector 76 may obtain 110 a training data set from the BSS system 24 and obtain 108 VXML workflows from the response device 24, where a work flow may correspond to a section of the VXML file in which a pointer to a response may be specified. The feature selector 76 may in this case also obtain a sample set of event and status data, where the status data may also be denoted account data as it is typically related to user accounts. The sample set of event and status data is then applied together with indications of a number of known desired responses in the response or decision tree model 78. The event and status data may then comprise data about all possible events that a user may be involved in, data about all possible statuses or states that an account may have and the indications may be the indications of all possible response types that may exist and being defined by a workflow.

The training may more particularly involve applying the training data as features associated with the sample set of a number of possible events and a number of known desired response types in the response selecting or decision tree model.

This could be carried out in the following way:

Let E be the set of identified events in the event extractor 68, F be the set of all features with respect to the events.

$$E = \{e_1, e_2, \ldots, e_n\}$$

$$F = \{F_1, F_2, \ldots, F_n\}$$

where $$F_n = \{f_1^e{}_m f_2^e{}_n \ldots f_x^e{}_n\}$$

The process of identifying the relevant features with respect to events may be done manually and if needed feature selection methods like forward selection, backward elimination etc. may be carried out.

In the training response type indicators may be mapped on to the events using a classifier that is an ensemble of classifiers comprising decision trees with parameters chosen from the feature set (F). The final classification is based on a vote from each decision tree for a given response indicator. The indicator with most number of votes is chosen as the final.

The ensemble of classifier may be denoted as h= $\{h_1, h_2, \ldots h_k\}$

Let there be a training dataset T=$\{(F_i, Y_i)\}$ i=1 . . . n where Y is the expected indicator.

The training learns the classifier/decision tree $h_k(Fi|P_k)$ by probabilistic method based on the training dataset, where $P_k$ is the subset of the feature set.

Using the trained classifiers, the given set of events will be labeled or linked to a corresponding response type identifier based on its features and the set of identifiers is passed on to the action module 80.

After the model has been trained in this way the response handling arrangement is ready to be put into operation.

As before the user U1 connects to the response device 24, which may be through making a telephone call C, for instance in the communication network 12 from the mobile station 10 via the MSC 20 and IMS 21 to the response device 24. The user U1 may thereby initiate a call C, 114 to the response device 24. The response device 24 thus receives a connection initiation from the user, step 88, here in the form of a call initiation, and then the response device 24 sends a request RS 116 to the response prioritizing device 26, step 90. The request may be a request for a workflow based on the user identifier, such as based on a user MSISDN.

The request RS is then received by the response prioritizing device 26, step 96, where the extraction module 66 then proceeds and extracts or obtains event data ED 118 using the event extractor 68 and status data SD 120 using the account extractor 70, step 98. The event and status data are in this case obtained from the BSS 22. The event data ED may involve data of any type of user interactions with the communication network preceding the reception of the request RS and may thus be data in the predefined time window, which may be any of the previously described time window examples. The event data ED may be any of the previously described event data that was caused to be generated in the communication network by user interactions and the status data SD may be any of the previously mentioned status data. The VXML extractor 72 of the extraction module 66 may in this case also extract the VXLM file or the workflows identified in the sections of the VXML file. Alternatively the workflows may already be known by the response prioritizing device 26 or be fetched from response device 24.

Thereafter the event and status data ED and SD are applied 122 in the response selecting model 78 of the trained machine learning module 74, step 100. The event and status data ED and SD may then be processed by the machine learning module 74 and as a result, an indication of a type of response is obtained from the machine learning module 74, step 102.

As was discussed above, the machine learning module 74 may comprise a number of classifiers that independently determine response type. The response type indication delivered by the machine learning module 74 is then the response type that a majority of the classifiers determined to be correct based on the event and status data. The classifiers thus each independently determines a type of response and the response type indication obtained from the machine learning module is an indication corresponding to a response type that a majority of the classifiers have determined. The result is an indication of a prioritized workflow, which may be an indication of a section in the VXML file comprising the prioritized workflow including a pointer to the response. Alternatively it may be an actual workflow comprising the pointer and possibly also further instructions. As an example it is possible that a first indication I1 pointing to a first section SEC1 of the VXML file is selected. In this first section SEC1 it is also possible that a first pointer PR1 to a first response R1 is identified, which pointer PR1 may point at an actual media file to be played. The action module 80 then responds 124 to the request RS with the identification of the selected type of response, which may be provided through the use of a prioritized workflow, step 104. The applicator 82 thus sends the indication I1 to the response device 24.

In the response device 24 the indication I is then received, step 92, and a response R1 corresponding to the indication I1 selected from the first database 50, step 93. The response device 24 then sends the response R1 to the user U1 in the connection C over which the initiation was made, step 94, and thereby the response R1 is delivered in real-time. The making of a real-time response may involve rendering or playing the media file on the mobile station of the user, which rendering may be the playing or streaming of a sound file.

In this way it is possible to obtain a Prioritized VXML workflow based on the feature selection and application of the Decision Tree Model, which is instructed to the IVR forming the response device to announce towards the customer and take appropriate action.

It is possible that the workflow such as the first section SEC1 in the addition to the pointer PR1 comprises data specifying how further user interaction with the response device 24 is to be handled. One way in which the user may interact is through declining the response. The user may thus reject the response type selected by the response device. If this is done, for instance through suitable DTMF signalling, the response device 24 may be set to select and send a default response, which may be done through providing a default menu 130 through which the user may navigate in a known manner in order to obtain a response that he or she desires.

The operation according to the second embodiment may additional be descried in the following way may also be described in the following way—

1. The response prioritizing device prepares by extracting all the VXML workflow available in the response device.
2. User calls response device for the rectification action for a particular issue/case.

3. On receiving the user request, the response device initiates check ForWorkflow message towards the response prioritizing device.
4. The response prioritizing device starts the real-time extracting (for a pre-configured duration) of the user latest events and current account status information.
5. The response prioritizing device performs M-L based optimization and identifies the VXML related workflow for the probable cause of the customer call.
6. The response prioritizing device responds back to the responding device with the prioritized workflow.
7. The response device plays the prioritized workflow to the customer and if the user doesn't accept, then the default menu is announced.

The invention has a number of advantages.
1. It improves Customer Experience—the user does not have to listen to boring options in order to reach the right option he or she desires
2. It provides Faster Resolution of complaints due to the pre-processed information that is already at hand i.e. there is no need to search after listening to customer, e.g. if there is refill error and customer calls, then the response handling arrangement knows that there is a refill error, identifies the possible causes and the proper resolution, so the response handling arrangement welcomes the use and asks whether the user called for the refill error and provides the possible resolution.

Thereby the average time that the users are involved with the response device may be reduced. Consequently the number of users that can be served may also be increased.

Figure 12:
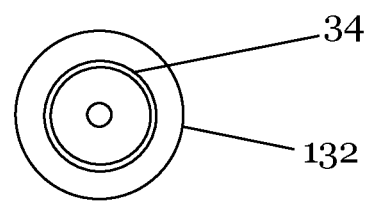
FIG. 12 shows a computer program product comprising a data carrier with computer program code for implementing the functionality of the response prioritizing device.

The computer program code of the response prioritizing device may be in the form of computer program product for instance in the form of a data carrier, such as a CD ROM disc or a memory stick. In this case the data carrier carries a computer program with the computer program code, which will implement the functionality of the above-described behaviour investigating device. One such data carrier 132 with computer program code 34 is schematically shown in FIG. 12.

Figure 13:
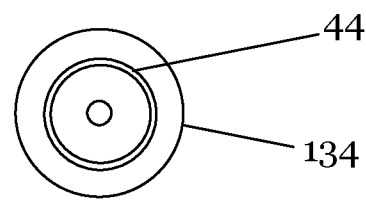
FIG. 13 shows a computer program product comprising a data carrier with computer program code for implementing the functionality of the response device.

Also the computer program code of the response device may be in the form of computer program product for instance in the form of a data carrier, such as a CD ROM disc or a memory stick. In this case the data carrier carries a computer program with the computer program code, which will implement the functionality of the above-described behaviour investigating device. One such data carrier 134 with computer program code 44 is schematically shown in FIG. 13.

The response prioritizing device may be considered as comprising
means for obtaining event data and/or status data in the communication network concerning a user, said obtaining being triggered by the user (U1) initiating a connection to a response device of the communication network,
means for applying the event data and/or status data in a response selecting model of a trained machine learning module, and
means for obtaining an indication of a type of response from the response selecting model of the trained machine learning module based on the applied event data and/or status data for allowing a real-time response of the response type to be made to the user by the response device.

Furthermore, the response prioritizing device may be considered to comprise means for implementing the machine learning module and means for training the machine learning module through applying training data comprising features associated with a sample set of events and a number of known desired response types in order to obtain the response selecting model.

The machine learning module may comprise a number of classifiers, each independently determining a type of response. In this case the means for obtaining an indication of a type of response may be means for obtaining an indication corresponding to a response type that a majority of the classifiers have determined.

The response device may in turn be considered to comprise
means for receiving the connection initiation,
means for selecting a response of the response type according to the indication, and
means for making the selected response to the user via a user connection being set up based on the connection initiation.

The response device may additionally be considered to comprise means for selecting a default response in case the user rejects the selected response.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the invention is only to be limited by the following claims.

The invention claimed is:
1. A response handling arrangement for handling responses to users of a communication network, the response handling arrangement comprising:
a response prioritizing device having processing circuitry;
memory containing instructions executable by the processing circuitry whereby the response prioritizing device is operative to:
obtain event data and/or status data in the communication network concerning a user, the obtaining being triggered by the user initiating a connection to a response device of the communication network;
apply the event data and/or status data in a response selecting model of a trained machine learning module; and
obtain an indication of a type of response to the user from the response selecting model of the trained machine learning module based on the applied event data and/or status data for allowing a real-time response of the response type to be made to the user by the response device.

2. The response handling arrangement of claim 1, further comprising the response device, wherein the response device is configured to:
receive the connection initiation;
select a response of the response type according to the indication; and
make the selected response to the user via a user connection being set up based on the connection initiation.

3. The response handling arrangement of claim 2, wherein the response device is configured to, when the user rejects the selected response, select a default response.

4. The response handling arrangement of claim 1, wherein the instructions are such that the response prioritizing device is operative to obtain the event data and/or status data in a data collecting window that precedes the user initiating a connection to the response device.

5. The response handling arrangement of claim 1, wherein each indication points to a corresponding section of a markup language file, the section specifying a response to be given to the user and how user inputs are to be interpreted.

6. The response handling arrangement of claim 1, wherein the instructions are such that the response prioritizing device is operative to implement the machine learning module and train it through applying training data comprising features associated with a sample set of events and a number of known desired response types in order to obtain the response selecting model.

7. The response handling arrangement of claim 6, wherein the training is performed using a probabilistic training method.

8. The response handling arrangement of claim 1:
wherein the machine learning module comprises a number of classifiers, each independently determining a type of response; and
wherein the instructions are such that the response prioritizing device is operative to, when obtaining the indication, obtain an indication corresponding to a response type that a majority of the classifiers have determined.

9. The response handling arrangement of claim 1:
wherein the event data comprises data of activities made by the user in the communication network; and
wherein the status data comprises user account data.

10. The response handling arrangement of claim 1, wherein each response type is related to a different type of topic provided by the response device.

11. The response handling arrangement of claim 10, where the response comprises options to the user in the topics of charging or billing, network use, customer account management, and/or purchases.

12. The response handling arrangement of claim 1, wherein the response device is an interactive voice response system and the initiated connection is a telephone call to the response device.

13. A method for handling responses to users of a communication network, the method being performed in a response handling arrangement and comprising:
obtaining event data and/or status data in the communication network concerning a user, the obtaining being triggered by the user initiating a connection to a response device of the communication network;
applying the event data and/or status data in a response selecting model of a trained machine learning module; and
obtaining an indication of a type of response from the response selecting model of the trained machine learning module based on the applied event data and/or status data for allowing a real-time response of the response type to be made to the user by the response device.

14. The method of claim 13, further comprising:
receiving the connection initiation;
selecting a response of the response type according to the indication; and
making the selected response to the user via a user connection being set up based on the connection initiation.

15. The method of claim 14, further comprising selecting a default response when the user rejects the selected response.

16. The method of claim 13, further comprising training the machine learning module through applying training data comprising features associated with a sample set of events and a number of known desired response types in order to obtain the response selecting model.

17. The method of claim 13:
wherein the machine learning module comprises a number of classifiers, each independently determining a type of response;
wherein the obtaining the indication comprises obtain an indication corresponding to a response type that a majority of the classifiers have determined.

18. A non-transitory computer readable recording medium storing a computer program product for handling responses to users of a communication network, the computer program product comprising program instructions which, when run on processing circuitry of a response handling arrangement, causes the response handling arrangement to:
obtain event data and/or status data in the communication network concerning a user, the obtaining being triggered by a user initiating a connection to a response device of the communication network;
apply the event data and/or status data in a response selecting model of a trained machine learning module; and
obtain an indication of a type of response from the response selecting model of the trained machine learning module based on the applied event data and/or status data for allowing a real-time response of the response type to be made to the user by the response device.

19. A communication network, comprising:
a response handling arrangement for handling responses to users of the communication network, the response handling arrangement comprising:
a response prioritizing device having processing circuitry;
memory containing instructions executable by the processing circuitry whereby the response prioritizing device is operative to:
obtain event data and/or status data in the communication network concerning a user, the obtaining being triggered by the user initiating a connection to a response device of the communication network;
apply the event data and/or status data in a response selecting model of a trained machine learning module; and
obtain an indication of a type of response to the user from the response selecting model of the trained machine learning module based on the applied event data and/or status data for allowing a real-time response of the response type to be made to the user by the response device.

* * * * *